United States Patent
Wyss

(10) Patent No.: US 6,518,752 B1
(45) Date of Patent: Feb. 11, 2003

(54) RESOLVER FOR MEASURING AND DETERMINING ANGULAR POSITIONS OR REVOLUTIONS OF A SHAFT

(76) Inventor: Walter Wyss, Humrigenstrasse 51, CH-8704 Herrliberg (CH)

(*) Notice: Subject to any disclaimer, the term of this patent is extended or adjusted under 35 U.S.C. 154(b) by 0 days.

(21) Appl. No.: 07/949,235

(22) Filed: Dec. 6, 1994

(30) Foreign Application Priority Data

Mar. 22, 1991 (CH) ................................................ 884/91

(51) Int. Cl.⁷ ................................................ G01B 7/30
(52) U.S. Cl. ............. 324/207.25; 324/174; 324/207.17; 324/207.15; 318/661
(58) Field of Search ............................ 324/168, 207.25, 324/207.12, 207.15–207.19, 225, 173–174; 702/142, 145, 151; 318/661, 652–660; 336/45

(56) References Cited

U.S. PATENT DOCUMENTS

| | | | |
|---|---|---|---|
| 3,398,386 A | 8/1968 | Summerlin | |
| 4,764,767 A | * 8/1988 | Ichikawa et al. | 324/174 |
| 4,962,331 A | 10/1990 | Smith | |
| 5,521,495 A | * 5/1996 | Takahashi et al. | 324/207.18 |

FOREIGN PATENT DOCUMENTS

| | | |
|---|---|---|
| DE | 706 703 | 6/1941 |
| EP | 0 174 290 A1 | 3/1986 |
| WO | WO 92/16994 | * 10/1992 |

* cited by examiner

Primary Examiner—Jay Patidar
(74) Attorney, Agent, or Firm—Breiner & Breiner, L.L.C.

(57) ABSTRACT

A resolver for measuring or detecting the angular positions of a shaft is characterized by the fact that the stator (1,2) carries all windings, i.e. the exciting, winding (3) and the measurement winding (4), whereas the rotor (5) comprises a purely mechanical structure. The rotor carries at its circumference polar surfaces having different polarities that cooperate with the stator windings. The polar surfaces (6,7) are designed in such a way that they have in each angular position of the rotor a reluctance that is specific to that position. This resolver with an extremely simple design allows very precise measurements to be carried out.

3 Claims, 2 Drawing Sheets

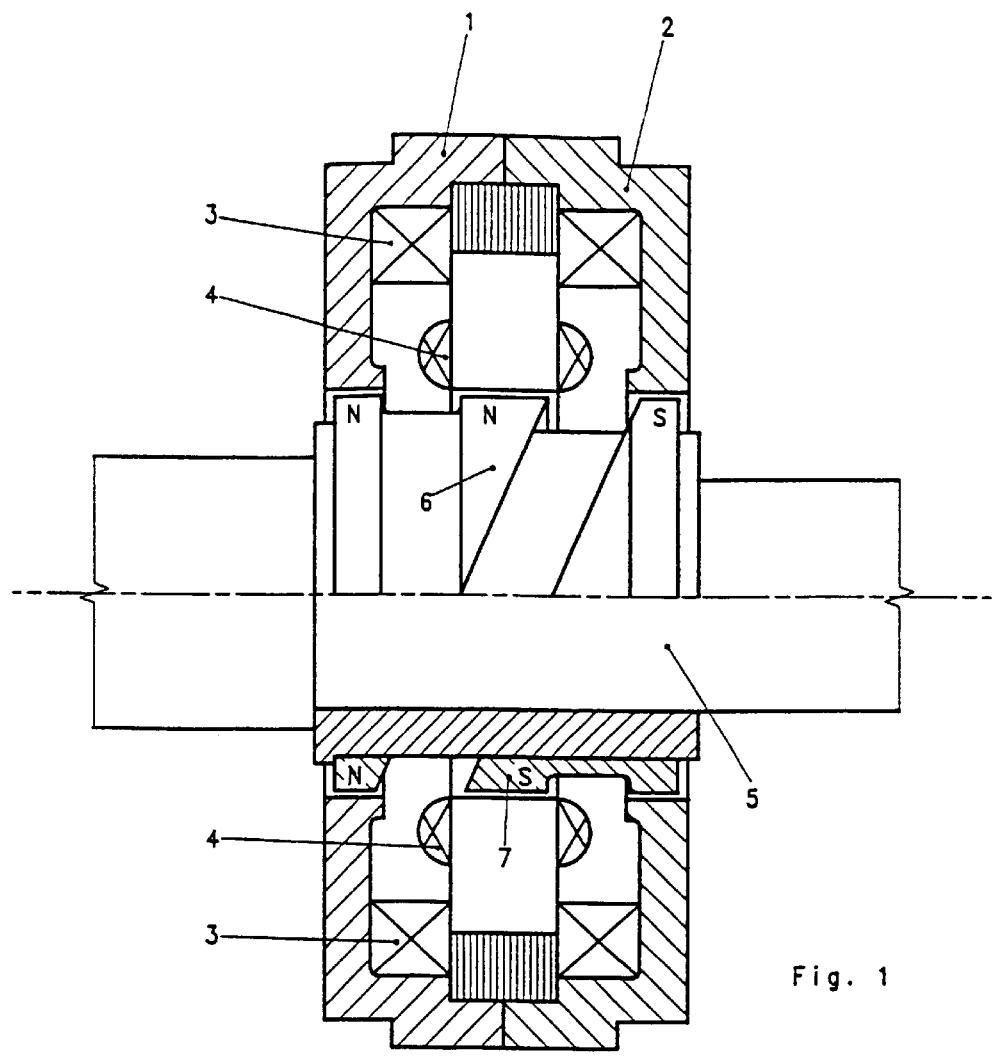
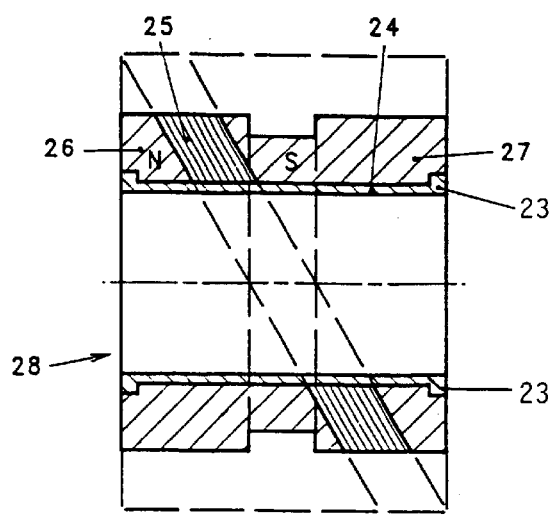
Fig. 1
Fig. 2

RESOLVER FOR MEASURING AND DETERMINING ANGULAR POSITIONS OR REVOLUTIONS OF A SHAFT

FIELD OF THE INVENTION

The present invention relates to a so-called resolver for measuring or determining of angle positions or revolutions of a shaft by using an inductive magnetic field between a stator and a rotor connected or connectable to said shaft.

BACKGROUND OF THE INVENTION

Such devices consist in principle of sensors which measure angles or revolutions by using the inductance principle. With existing devices the needed inductance coils are installed in the stator and rotor. In resolvers which have to establish particularly the exact angle position of the rotor the required coils have to be mounted by hand, which is very expensive to do.

This very expensive production technique limits the versatility of the usual type of resolvers.

It has been tried to reduce the production costs by mounting the inductance coils only on the stator and to give the rotor an elliptical shape, thus allowing the determination of the exact angle position of a shaft. Eliptical rotors are, however, very expensive to manufacture as well.

SUMMARY OF THE INVENTION

It is an object of the present invention to build up a resolver much simpler, in order to reduce the production costs and to allow versatility of the models to be produced. At the same time, it be of course required that the accuracy is at least as good, if not better than that of presently used resolvers.

Resolvers are particularly used for industrial automation and motion controls.

In order to solve this problem the resolver in accordance with the invention is characterized in that the stator only is provided with an induction coil and a measuring coil, whereas the rotor is equipped on its circumference with a number of pole surfaces of differing polarity which interact with said stator coils, whereby the pole surfaces are formed in such a way as to present in each angle position of the rotor a reluctance which is specific for this position.

Preferably the pole surfaces of the rotor are formed as slight protrusions on the rotor circumference. The pole surfaces, seen over the whole circumference, may continuously change their surface or be of a shape that the airgap between the pole surface and the corresponding stator part will continuously differ in each angle position (continuous change).

These pole surfaces 6,7 as illustrated in FIG. 1, are shaped such that they generate in each position of the rotor 5 an inductance specific for each position. This variable inductance can be obtained by a continuously changing of the pole surfaces (surface) or by different thickness of said protuberances, leading to different heights of the airgap of the active pole surface between rotor and stator.

This very simple design of the proposed resolver allows every exact measurement and accurate determination of the angle position of the rotor over 360°.

Any other shape and arrangement of the magnetic pole surfaces of differing polarity are of course within the scope of the invention.

In a special embodiment of the invention the effective pole surface of each polarity extend over 180° of the rotor circumference and vary continuously from a minimum to a maximum.

The rotor can be placed in an axial passage of the stator 29, as shown in FIG. 3, or the sleeve shaped end section of the rotor comprising the effective pole surfaces can extend into the axial gap of the stator. Whereby the induction coil and the measuring coil of the stator may be positioned on one or the other side of the rotor extension.

In principle the rotor can also be positioned. in a radial gap of the stator whereby the stator coils should be positioned, similar as in the execution with the axial gap, on both sides of the pole surfaces of the rotor.

BRIEF DESCRIPTION OF THE DRAWINGS

The invention will in the following be further described by means of embodiments shown in the drawings, in which:

FIG. 1 the principle construction of a resolver according to the invention, partially in section;

FIG. 2 a preferred embodiment of the rotor, in section, of a resolver according to the invention;

The resolver represented schematically in FIG. 1 consists of a stator 1,2 in which is mounted the inductance coil 3 and the measuring coil 4. The rotor 5 does not carry any coil and is arranged in an axial through-passage of the stator. On the circumference of the operative part of the rotor are provided pro-tuberances representing pole surfaces N and S of differing magnetic polarity.

Figure 3:
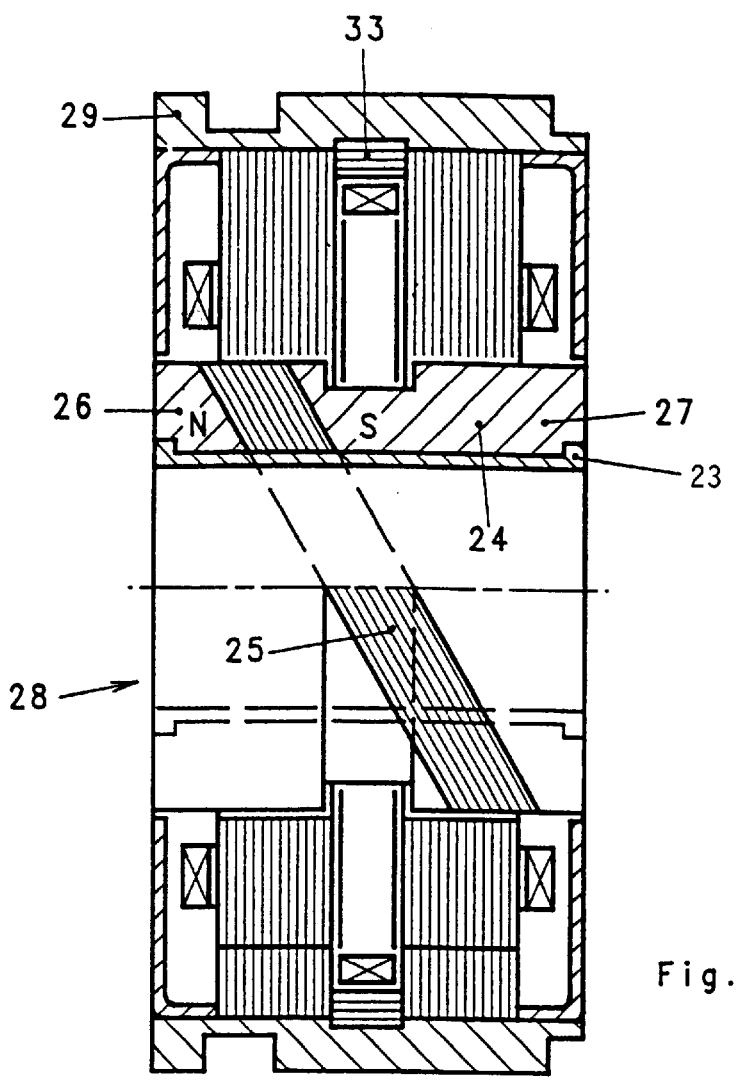
FIG. 3 a section through a resolver equipped with a rotor according to FIG. 2, and FIG. 4 a purely schematic representation of the corrugated inclined surfaces of the holding cylinders of magnet ring pile.

FIGS. 2 and 3 represent a further variant of a rotor 28 (FIG. 2) or a resolver equipped therewith (FIG. 3).

In this variant the rotor is of simple construction and easy to produce: The rotor 28 consists of an inner cylindrical sleeve 24 made from non-magnetic material having arranged on its outer surface a magnet ring 25 consisting of a number of separate rings tightly pressed together. This magnet ring 25 is parallel to a plane inclined with respect to the rotor axis. The magnet ring 25 is held in place on both sides by cylindrical rings 26,27 the end surfaces of which are held by flanged parts 23 of the inner sleeve (with all components pressed together).

The inner end surfaces of rings 26,27 also made of non-magnetic material are also inclined and parallel to said plane, so as to enclose the magnet ring 25 between the rings 26,27.

FIG. 2 illustrates how the rotor 28 is first produced as unfinished piece with greater diameter (the outer shape is shown in dotted lines) and thereafter machined to the desired size.

With this approach and departing from a base body it is possible to produce in a simple manner rotors of different diameters.

If the resolver (FIG. 3) is provided with a magnet yoke 33 no magnetic disturbances of the coils are produced (accuracy of measurements).

The embodiment of the resolver as shown in FIG. 3 may be a so-called full-metal-sheet construction, wherein particularly yoke 33 of strip material (e.g. a metal sheet spiral) together with the other parts of the fully laminated construction is responsible for a high (strong) output signal.

As already mentioned, the construction of the rotor 28 in accordance with FIG. 2 permits a simple and precise manufacture (with a wide range of possible rotor diameters).

Figure 4:
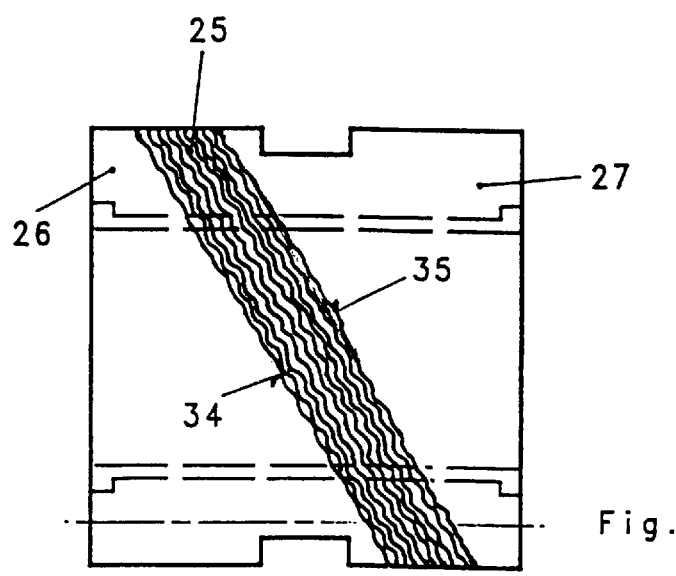

As illustrated by FIG. 4 the inner inclined surfaces of the cylindrical holding rings 26,27 enclosing the pile 25 of magnet rings which are slightly undulated, when seen in the longitudinal direction of the surfaces (corrugated lines inclined surfaces 34,35 in FIG. 4), which surprisingly increases substantially the accuracy of the signal. It is sufficient to machine by a milling tool the inclined surfaces in the direction of the longitudinal axis of the surfaces. The corrugations or undulations obtained by the precise machining step have a small height (in the range of some of up to a few tenths of a millimeter) to lead to the desired objective.

By pressing together the pile of magnet rings 25 by means of the cylindrical rings 26,27 said pile deformed in such a manner that it follows as a whole said corrugations at the contact surfaces with the rings 26,27 but remains practically flat in the center part of the pile (the individual magnet rings).

What is claimed is:

1. Resolver for measuring and detecting angular positions and revolutions of a shaft using an induced magnetic field between a stator and a rotor, comprising a stator and a rotor, the rotor being connectable to a shaft, the stator being wound with a field winding and a measurement coil, the rotor being provided a circumference having thereon pole surfaces,of different polarity which interact with the winding on the stator, the pole surfaces being structured so that a magnetic flux distribution which is specific for a position exists for each angular position of the rotor, and the rotor being constructed as a hollow cylindrical base body, the base body being made of non-magnetic material having an outer casing provided with a ring which is circumferentially parallel to a plane at an oblique angle to a longitudinal axis of the rotor, the ring being made of magnetic material and having said pole surfaces of different polarity, wherein the hollow cylindrical base body includes an inner cylindrical sleeve having end surfaces and a casing surface on which two cylindrical bodies, made of non-magnetic material having outer end surfaces and mutually opposite inner end surfaces, are placed at a distance from one another, the outer end surfaces running approximately flush with the end surfaces of the inner cylindrical sleeve, while the mutually opposite inner end surfaces run at an oblique angle parallel to a plane which is at an oblique angle with respect to the longitudinal axis of the rotor, to fix between the two cylindrical bodies the ring made of magnetic material the end surface of the inner cylindrical sleeve are flanged.

2. The resolver according to claim 1 wherein the ring comprises a plurality of annular elements arranged adjacent one another and made of electrical sheet metal.

3. The resolver according to claim 2 wherein the inner end surfaces of the two cylindrical bodies are provided with corrugations, and the plurality of annular elements is fixed therebetween with slight deformation of the plurality of annular elements.

* * * * *

UNITED STATES PATENT AND TRADEMARK OFFICE
CERTIFICATE OF CORRECTION

PATENT NO.    : 6,518,752 B1
DATED         : February 11, 2003
INVENTOR(S)   : Walter Wyss It is certified that error appears in the above-identified patent and that said Letters Patent is hereby corrected as shown below:

Title page,
Item [22], delete "[22] Filed: Dec. 6, 1994" insert the following:
-- [22]   PCT Filed:      Mar. 19, 1992
   [86]   PCT No.         PCT/CH92/00056
          § 371 (c) (1),
          (2), (4) Date:  Dec. 6, 1994
   [87]   PCT Pub. No.:   WO92/16994
          PCT Pub. Date:  Oct. 1, 1992 --.

Column 1,
Line 26, "Eliptical" should read -- Elliptical --.
Line 34, "it be of" should read -- it is of --.
Line 35, "is at least" should read -- be at least --.
Line 63, "every" should read -- very --.

Column 2,
Line 11, "positioned. in" should read -- positioned in --.

Column 3,
Line 13, "some of up" should read -- some microns up --.
Line 16, "pile deformed" should read -- pile is deformed --.
Line 27, "surfaces," should read -- surfaces --.

Column 4,
Line 19, "material the" should read -- material, the --.

Signed and Sealed this

Twenty-ninth Day of June, 2004

JON W. DUDAS
*Acting Director of the United States Patent and Trademark Office*